US012786341B2

(12) United States Patent
Kawazoe et al.

(10) Patent No.: US 12,786,341 B2
(45) Date of Patent: Nov. 3, 2026

(54) COLORIMETER HAVING A REFERENCE PLATE WITH MULTIPLE HEIGHTS CORRESPONDING TO RECORDING MEDIUM THICKNESS AND IMAGE FORMING APPARATUS

(71) Applicants: Osamu Kawazoe, Kanagawa (JP); Dan Ozasa, Kanagawa (JP); Yohhei Watanabe, Kanagawa (JP); Kohei Shimbo, Kanagawa (JP)

(72) Inventors: Osamu Kawazoe, Kanagawa (JP); Dan Ozasa, Kanagawa (JP); Yohhei Watanabe, Kanagawa (JP); Kohei Shimbo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 240 days.

(21) Appl. No.: 18/677,024

(22) Filed: May 29, 2024

(65) Prior Publication Data

US 2024/0406336 A1 Dec. 5, 2024

(30) Foreign Application Priority Data

May 31, 2023 (JP) ................................ 2023-090105
May 24, 2024 (JP) ................................ 2024-084444

(51) Int. Cl.
*H04N 1/60* (2006.01)
*G01J 3/50* (2006.01)
*H04N 1/00* (2006.01)

(52) U.S. Cl.
CPC ............ *H04N 1/6044* (2013.01); *G01J 3/502* (2013.01); *H04N 1/00045* (2013.01); *H04N 1/00063* (2013.01); *H04N 1/00068* (2013.01)

(58) Field of Classification Search
CPC ............. H04N 1/6044; H04N 1/00045; H04N 1/00063; H04N 1/00068; G01J 3/502
See application file for complete search history.

(56) References Cited

U.S. PATENT DOCUMENTS

2013/0162998 A1* 6/2013 Furuta .................. B41J 2/04558 356/402
2019/0327387 A1* 10/2019 Hashimoto ........ H04N 1/00037

FOREIGN PATENT DOCUMENTS

JP 2007-153580 A 6/2007
JP 2019-193088 A 10/2019

* cited by examiner

*Primary Examiner* — Christopher Wait
(74) *Attorney, Agent, or Firm* — IPUSA, PLLC

(57) ABSTRACT

A colorimeter includes a reference plate having a reference reading surface having multiple heights; a reader to read color information on a recording medium having a thickness; and read a white reference from the reference reading surface having one of the multiple heights corresponding to the thickness of the recording medium; and circuitry configured to perform calculation on the color information on the recording medium read by the reader using the white reference read from the reference reading surface by the reader.

10 Claims, 12 Drawing Sheets

COLORIMETER HAVING A REFERENCE PLATE WITH MULTIPLE HEIGHTS CORRESPONDING TO RECORDING MEDIUM THICKNESS AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-090105, filed on May 31, 2023 and Japanese Patent Application No. 2024-084444, filed on May 24, 2024, in the Japan Patent Office, the entire disclosure of which is hereby incorporated by reference herein.

BACKGROUND

Technical Field

Embodiments of the present invention relate to a colorimeter and an image forming apparatus including the same.

Related Art

Colorimeters have been developed to read a white reference displayed on a reference plate after reading an image formed on a recording medium such as paper, to correct color information.

SUMMARY

An embodiment of the present disclosure provides a colorimeter including: a reference plate having a reference reading surface having multiple heights; a reader to: read color information on a recording medium having a thickness; and read a white reference from the reference reading surface having one of the multiple heights corresponding to the thickness of the recording medium; and circuitry configured to perform calculation on the color information on the recording medium read by the reader using the white reference read from the reference reading surface by the reader.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
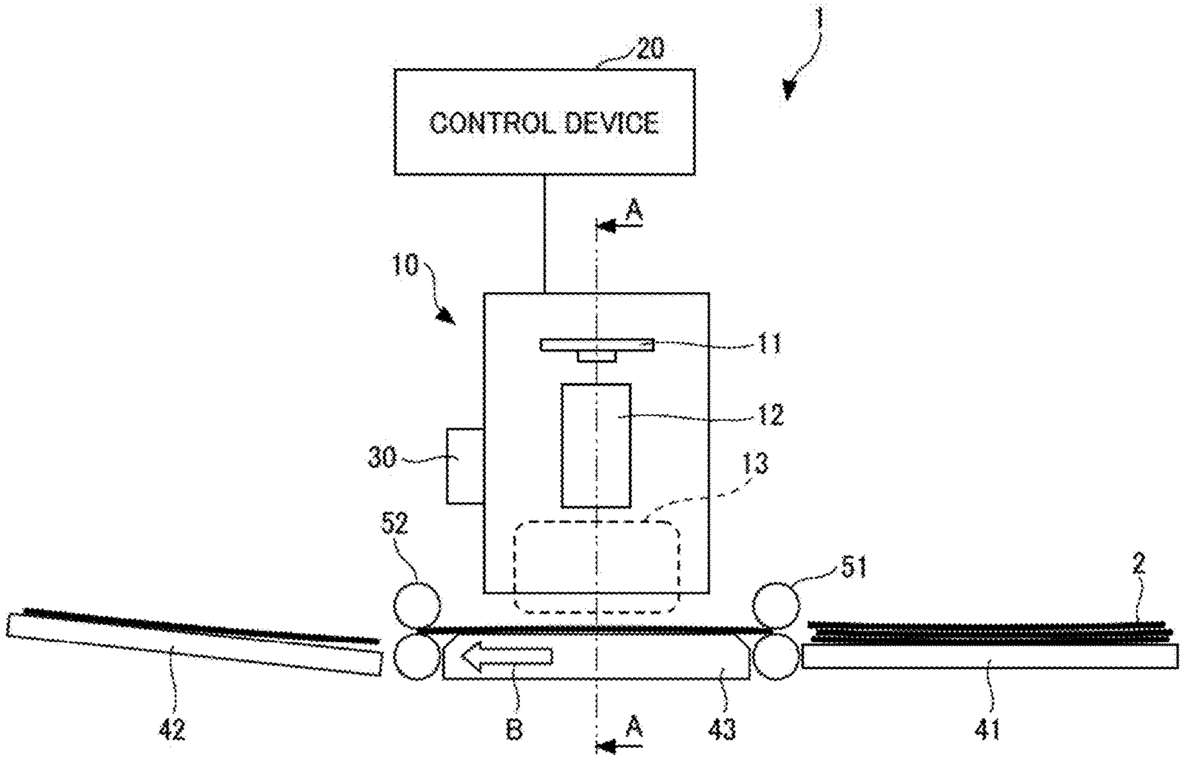
FIGS. 1A and 1B are diagrams each illustrating a configuration of a colorimeter.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An image reading device including a reading unit for reading images is known. In the image reading device, the original document with the image formed on it is moved so that it passes a position corresponding to the thickness of the original document relative to the reading unit.

In this configuration, if the thickness of the recording medium from which color information is read varies, the color measurement accuracy may decrease.

According to one aspect of the present disclosure, a colorimeter and an image forming device including it are provided, which allow higher color measurement accuracy on recording media of different thicknesses.

Embodiments of the present disclosure will be described below with reference to the drawings. A colorimeter and an image forming apparatus incorporating the colorimeter according to an embodiment of the present disclosure are described below to implement the technical ideas, and no limitation is indicated to an embodiment of the present disclosure given below. The dimensions, materials, and shapes of components, relative arrangements thereof, and the like described below are not intended to limit the scope of the present disclosure unless otherwise specified and are only examples for explanation. For example, the size of these elements and the relative positions of these elements may be exaggerated for illustration in the drawings. In the description given below with reference to the drawings, like reference signs denote like elements, and overlapping description may be simplified or omitted as appropriate.

Configuration of Colorimeter

Figure 1B:
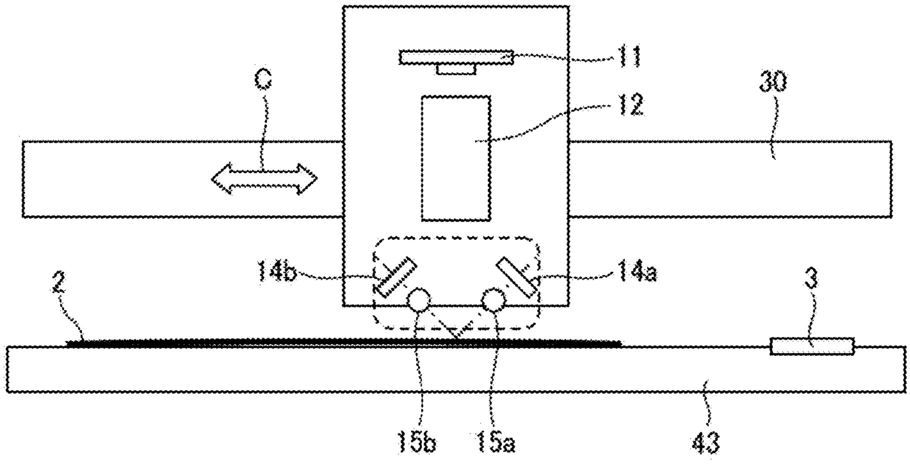

FIGS. 1A and 1B are diagrams illustrating a configuration of a colorimeter according to an embodiment of the present disclosure. FIG. 1A is a diagram of the colorimeter 1 as viewed in a direction orthogonal to a conveyance direction of a sheet. FIG. 1B is an A-A sectional view of the colorimeter 1 in FIG. 1A.

As illustrated in FIGS. 1A and 1B according to the present example, the colorimeter 1 includes a reader 10, a sheet feeder 41, a sheet ejector 42, a backing plate 43, a reader conveyor 30, a feed roller 51, an ejection roller 52, and a control device 20.

The reader 10 is designed to read color information recorded on a sheet 2, which is an example of a recording medium. For example, the reader 10 captures images from the sheet 2 to read the recorded color information. The reader 10 includes a color sensor 11, a lens 12, and a lighting unit 13. The lighting unit 13 includes two light sources 14*a* and 14*b* and two lenses 15*a* and 15*b*.

The light sources 14*a* and 14*b* emit reading light beams to the sheet 2, which is to be read, from different angles. For example, the light sources 14*a* and 14*b* each emit light at an angle of 45 degrees toward the sheet 2. Each of the light sources 14*a* and 14*b* may emit a line of light toward the sheet 2. In this case, the light sources 14*a* and 14*b* may include a white light-emitting diode (LED) array. The "LED" is an abbreviation for light emitting diode. The white LED array has an intensity across the substantially entire spectrum of visible light. The light sources 14*a* and 14*b* are not limited to one including an LED, and may include a fluorescent lamp such as a cold-cathode tube and a lamp light source. In at least one example, the light sources 14*a* and 14*b* emit light in a wavelength range for spectral separation, with a uniform intensity over the entire reading area of the sheet 2.

The lenses 15*a* and 15*b* are placed in the optical paths of the light beams emitted from the light sources 14*a* and 14*b*. The lenses 15*a* and 15*b* concentrate the light beams emitted from the light sources 14*a* and 14*b* and irradiate the sheet 2 with parallel or converging light.

The lens 12 is positioned so that its optical axis aligns with the normal direction of the reading surface of the sheet 2. The lens 12 forms an image with light (or a light flux) reflected from the sheet 2 onto an incident surface of the color sensor 11 at a predetermined magnification. In the present embodiment, the image-side telecentric characteristics are added to the lens 12. By adding the image-side telecentric characteristics to the lens 12, the chief ray of the light flux incident on the imaging plane can easily be made approximately parallel to the optical axis. In the present embodiment, the lens 12 is composed of multiple lenses. A rod lens can be employed as the collimating lens. The image-side telecentric characteristic may not be added to the lens 12. The chief ray of the light flux incident on the imaging plane is easily made substantially parallel to the optical axis by adjusting, for example, the relative positions of each pinhole of a pinhole array and each lens of a lens array according to the tilt of the chief ray at varying positions of the imaging plane.

The color sensor 11 serves to distribute the diffuse reflection light of the light emitted to the sheet 2, receive the distributed light, and output a signal in response to the reception of the distributed light.

The sheet 2 to be read is placed on the sheet feeder 41. The sheet feeder 41 feeds the sheet 2 to the reading area of the reader 10 through a pair of feed rollers 51. The pair of feed rollers 51 grips each sheet placed on the sheet feeder 41 and rotates, feeding it into the reading area of the reader 10.

The sheet ejector 42 receives a sheet 2 that has been read by the reader 10, using the pair of ejection rollers 52. The pair of ejection rollers 52 grips each sheet 2 that has been read by the reader 10 and rotates, feeding it onto the sheet ejector 42.

The backing plate 43 is positioned between the sheet feeder 41 and the sheet ejector 42, encompassing the reading area of the reader 10. The sheets 2 placed on the sheet feeder 41 are fed one by one onto the backing plate 43 by the pair of feed rollers 51. A reference plate 3 is placed on the backing plate 43, in an area distinct from the reading area of the reader 10.

The surface of the reference plate 3 facing the reader 10 serves as a reference reading surface. At least the reference reading surface of the reference plate 3 is white, which is used as a white reference for calculation of color information read from the sheet 2 by the reader 10. In some examples, the reference reading surface of the reference plate 3 displays a white color that represents the white reference.

Thus, the sheet 2 to be read is conveyed in the conveyance direction B from the sheet feeder 41 toward the sheet ejector 42, on the backing plate 43.

The reader conveyor 30 is an example of a conveyor in the present embodiment. The reader conveyor 30 moves the reader 10 in a direction along the reading surface of the sheet 2 and orthogonal to the conveyance direction B of the sheet 2. Specifically, the reader conveyor 30 moves the reader 10 in the movement direction C between a region facing the sheet 2 fed onto the backing plate 43 and a region facing the reference plate 3. The reader conveyor 30 may include a belt that holds the reader 10, and the reader 10 may be moved by the rotation of the belt.

In some examples, a sensor for detecting the sheet 2 is placed in the vicinity of the upstream end portion of the backing plate 43 in the conveyance direction B of the sheet 2.

Figure 2:
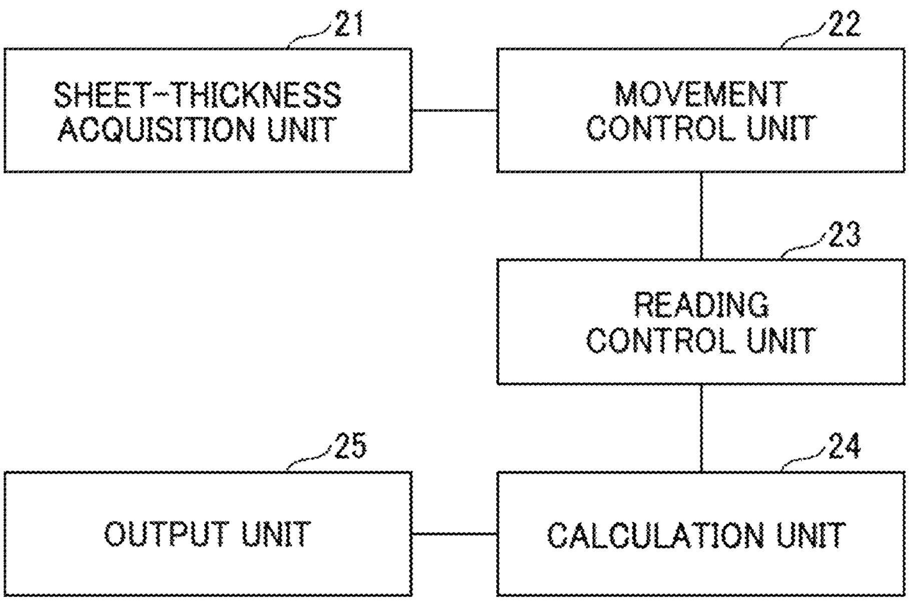
FIG. 2 is a block diagram of a functional configuration of a control device in FIGS. 1A and 1B.

FIG. 2 is a block diagram of a functional configuration of a control device 20 in FIGS. 1A and 1B.

As illustrated in FIG. 2, the control device 20 of the present embodiment includes a sheet-thickness acquisition unit 21, a movement control unit 22, a reading control unit 23, a calculation unit 24, and an output unit 25.

The sheet-thickness acquisition unit 21 acquires the thickness of the sheet 2 fed from the sheet feeder 41 onto the backing plate 43. When an input device such as an operation panel 70 (see FIGS. 11A and 11B) is included in the colorimeter 1 or the image forming apparatus 7 to be described below, the sheet-thickness acquisition unit 21 acquires information indicating the thickness of the sheet received by the input device. When a detector such as a sensor or a displacement sensor 60 is included in the colorimeter 1, the sheet-thickness acquisition unit 21 acquires information indicating the thickness of the sheet detected by the detector. The details of a sensor for detecting the thickness of the sheet 2 will be described later.

The movement control unit 22 controls the movement of the reader 10 by the reader conveyor 30. Specifically, when the reader 10 reads color information from the sheet 2, the movement control unit 22 moves the reader 10 to the region facing the sheet 2 fed onto the backing plate 43. When the reader 10 reads the white reference from the reference plate 3, the movement control unit 22 moves the reader 10 to the region facing the reference plate 3. At this time, the movement control unit 22 moves the reader 10 to a region corresponding to the thickness of the sheet 2 acquired by the sheet-thickness acquisition unit 21, in the region facing the reference plate 3.

The reading control unit 23 controls reading of the color information from the sheet 2 and reading of the white reference from the reference plate 3 by the reader 10, and outputs the reading results to the calculation unit 24.

The calculation unit 24 performs calculation on the color information read from the sheet 2 by the reader 10 using the white reference read from the reference plate 3 by the reader 10.

The output unit 25 outputs the calculation results of the calculation unit 24.

Operation of Colorimeter

The following describes an operation of the colorimeter 1.

Figure 3:
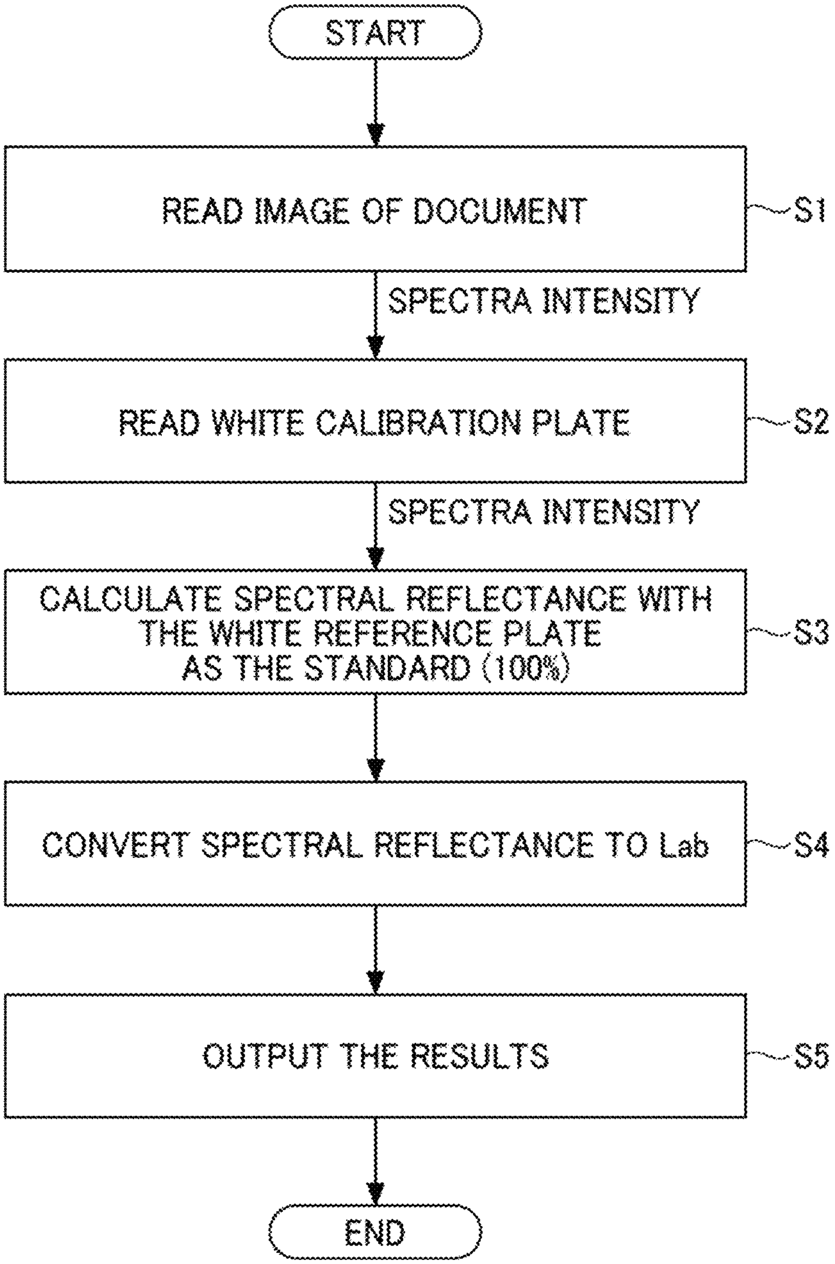
FIG. 3 is a flowchart of an operation of the colorimeter in FIGS. 1A and 1B.

FIG. 3 is a flowchart of an operation of the colorimeter 1 in FIGS. 1A and 1B.

In the colorimeter 1 illustrated in FIGS. 1A and 1B, first, the reader 10 is moved to the region facing the sheet 2 by the control of the movement control unit 22 in a state where the sheet 2 placed on the sheet feeder 41 is fed onto the backing plate 43. Then, the reader 10 reads the image formed on the sheet 2 under the control of the reading control unit 23 (step S1).

Before or after the processing in step S1, the movement control unit 22 control the reader 10 to move to the region facing the reference plate 3. Then, the reading control unit 23 controls the reader 10 to read the white reference on the reference reading surface of the reference plate 3 (step S2).

Thus, the reader 10 measures the spectral intensity of the image formed on the sheet 2 and the spectral intensity of the white reference of the reference plate 3.

Subsequently, the calculation unit 24 calculates the spectral reflectance of the image from the spectral intensities of the image formed on the sheet 2, with the spectral intensity of the white reference of the reference plate 3 as a reference of 100 (step S3).

In step S4, the calculation unit 24 converts the spectral reflectance calculated in step S3 into Lab values indicating lightness, hue, and chroma (step S4).

In this way, the calculation unit 24 performs calculation on the color information read from the sheet 2 by the reader 10 using the white reference read from the reference plate 3 by the reader 10.

Thereafter, the output unit 25 outputs the reading results based on the Lab values converted in step S4 (step S5).

The reader maintains the same lighting conditions from the light sources 14*a* and 14*b* of the reader 10 when reading images formed on the sheets 2 and the white reference on the reference reading surface of the reference plate 3. If these lighting conditions are not the same, errors in calculating the spectral reflectance increase, resulting in reduced measurement accuracy.

Operation when Lighting Conditions are not the Same

FIGS. 4A, 4B, 4C and FIG. 5 are diagrams illustrating operations for different thicknesses of the sheets 2.

Figure 4A:
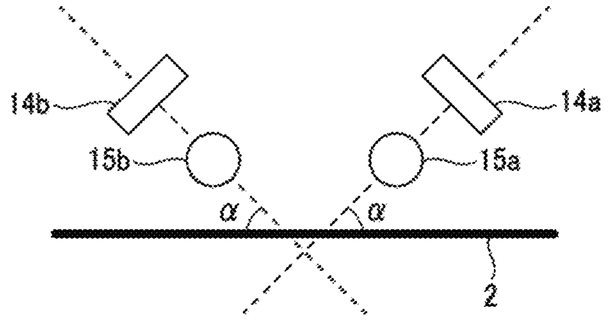
FIGS. 4A, 4B, and 4C are diagrams illustrating the operations of the colorimeter in FIGS. 1A and 1B for different thicknesses of sheets.

In the colorimeter 1 of FIGS. 1A and 1B, as illustrated in FIG. 4A, light emitted from the light source 14*a* and light emitted from the light source 14*b* strike the sheet 2 from two directions at an angle α of 45 degrees, and intersect with each other in the vicinity below the sheet 2. In this case, when the thickness of the sheet 2 is designed to be the same as that of the reference plate 3, the amount of light received by the sheet 2 with respect to the distance from the designed position of the reading region has a characteristic as indicated by the solid line in FIG. 5.

Figure 4B:
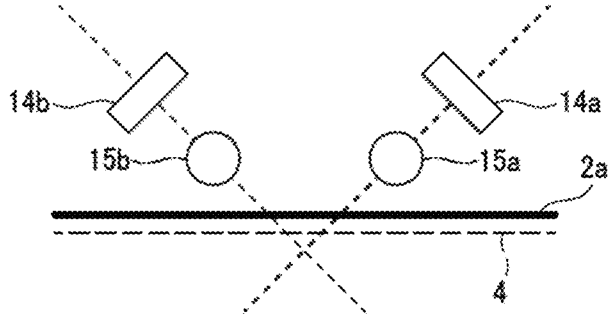
Figure 4C:
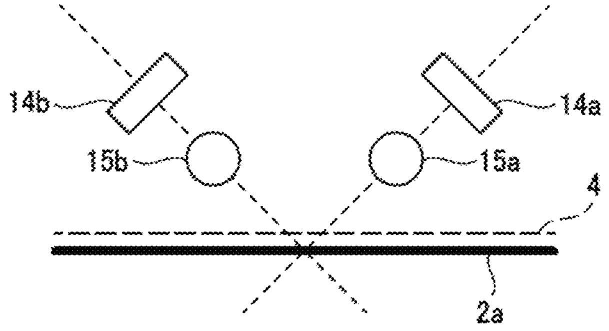
Figure 5:
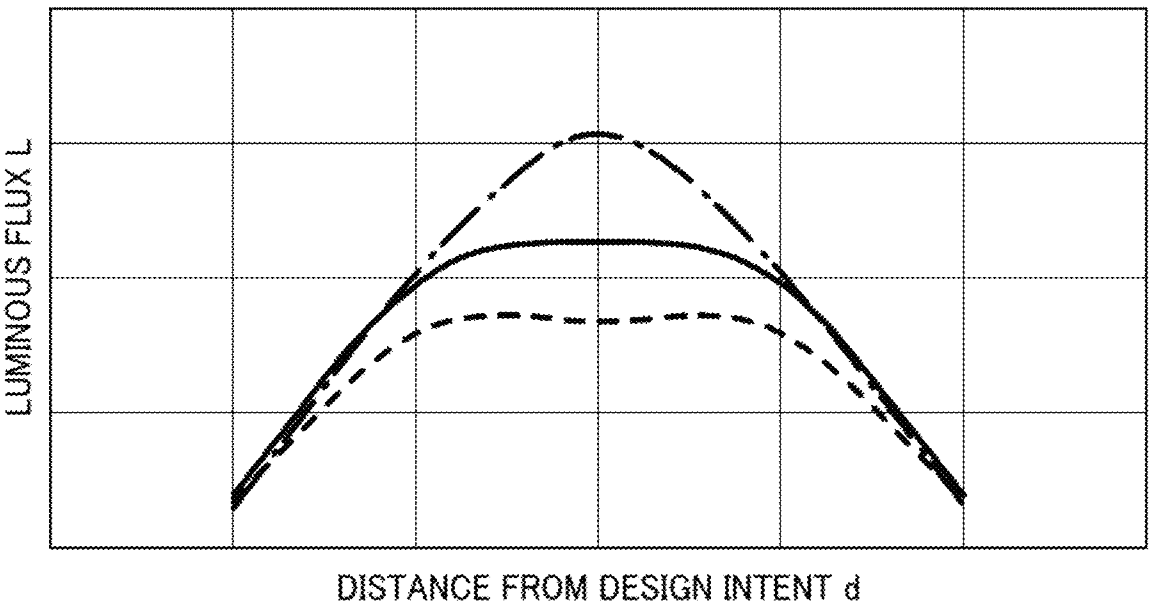
FIG. 5 is a graph of the operations for different thicknesses of sheets.

However, for example, when the sheet 2 is thicker than the reference plate 3, as illustrated in FIG. 4B, the reading surface 2*a* of the sheet 2 is closer to the light sources 14*a* and 14*b* than the designed center position 4, which is set to the same thickness as the reference plate 3. As a result, as illustrated by the broken line in FIG. 5, the peak light amount received by the sheet 2 decreases, and the light separates into the left and right sides, leading to an overall reduction in illumination intensity.

When the sheet 2 is thinner than the reference plate 3, the reading surface 2*a* of the sheet 2 is located farther from the light sources 14*a* and 14*b* than the designed center position 4, which is set to the same thickness of the reference plate 3. As a result, as indicated by the dot-and-dash line in FIG. 5, the peak light amount received by the sheet 2 increases, and the light beams emitted from the two light sources 14*a* and 14*b* overlap, leading to an overall increase in illumination intensity.

As described above, when the distances between the reading surface of the sheet 2 and the light sources 14*a* and 14*b* change, the lighting conditions differ between the image reading and the white reference reading. This results in errors in calculating spectra reflectance during the processes illustrated in FIG. 3.

It is known that at the image reading position, adjusting the height of sheets according to its thickness to maintain a constant distance between the reader and the sheets, and keeping the height of the white reference plate consistent with the distance from the reader to the sheet during image reading, can synchronize the conditions Further, it is also known that pressing the white reference plate and the sheet against the reference line of the reader keeps the distance between the reader and the sheet constant.

However, moving the paper vertically according to its thickness involves complex and costly setup.

To deal with such difficulties, in the present embodiment, a reference plate with multiple heights for the reference reading surface where the white reference is read is used. This allows for the selection of an appropriate height for reading white reference based on the thickness of a sheet to be read for its image to perform calculations regarding color information acquired by reading the white reference at the selected height.

First Embodiment

Figure 6:
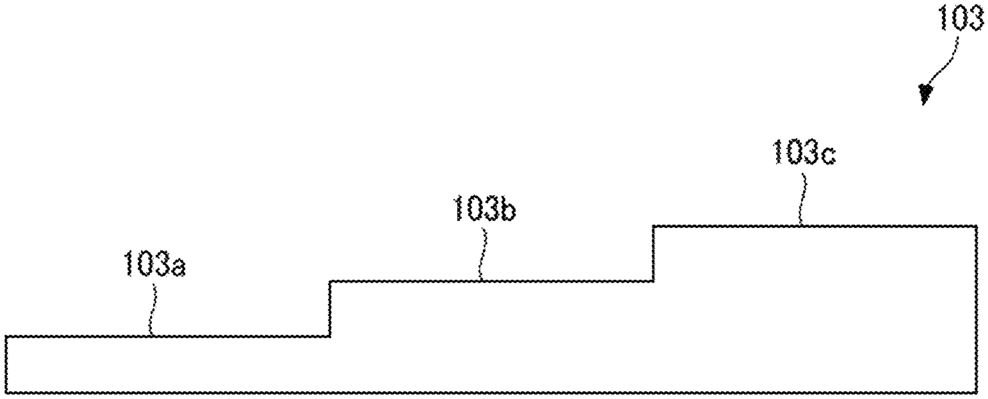
FIG. 6 is a diagram of a reference plate for use in a colorimeter according to a first embodiment of the present disclosure.

FIG. 6 is a diagram of a reference plate for use in a colorimeter according to a second embodiment of the present disclosure.

As illustrated in FIG. 6, the reference plate 103 used in the present embodiment has reference reading surfaces 103*a* to 103*c* for reading the white reference, which are arranged in a stepped manner. In other words, the reference reading surface has a stepped structure. With this configuration, the reference reading surfaces 103*a* to 103*c* have different heights, the height of the reference reading surface 103*a* is the lowest, and the height of the reference reading surface 103*c* is the highest. In this configuration, the reference plate 103 used in the present embodiment has reference reading surfaces 103*a* to 103*c* at different heights. The reference plate 103 may be configured such that the reference plate 103 itself has a color indicating the white reference, or the white reference may be displayed on each of the reference reading surfaces 103*a* to 103*c*.

Figure 7:
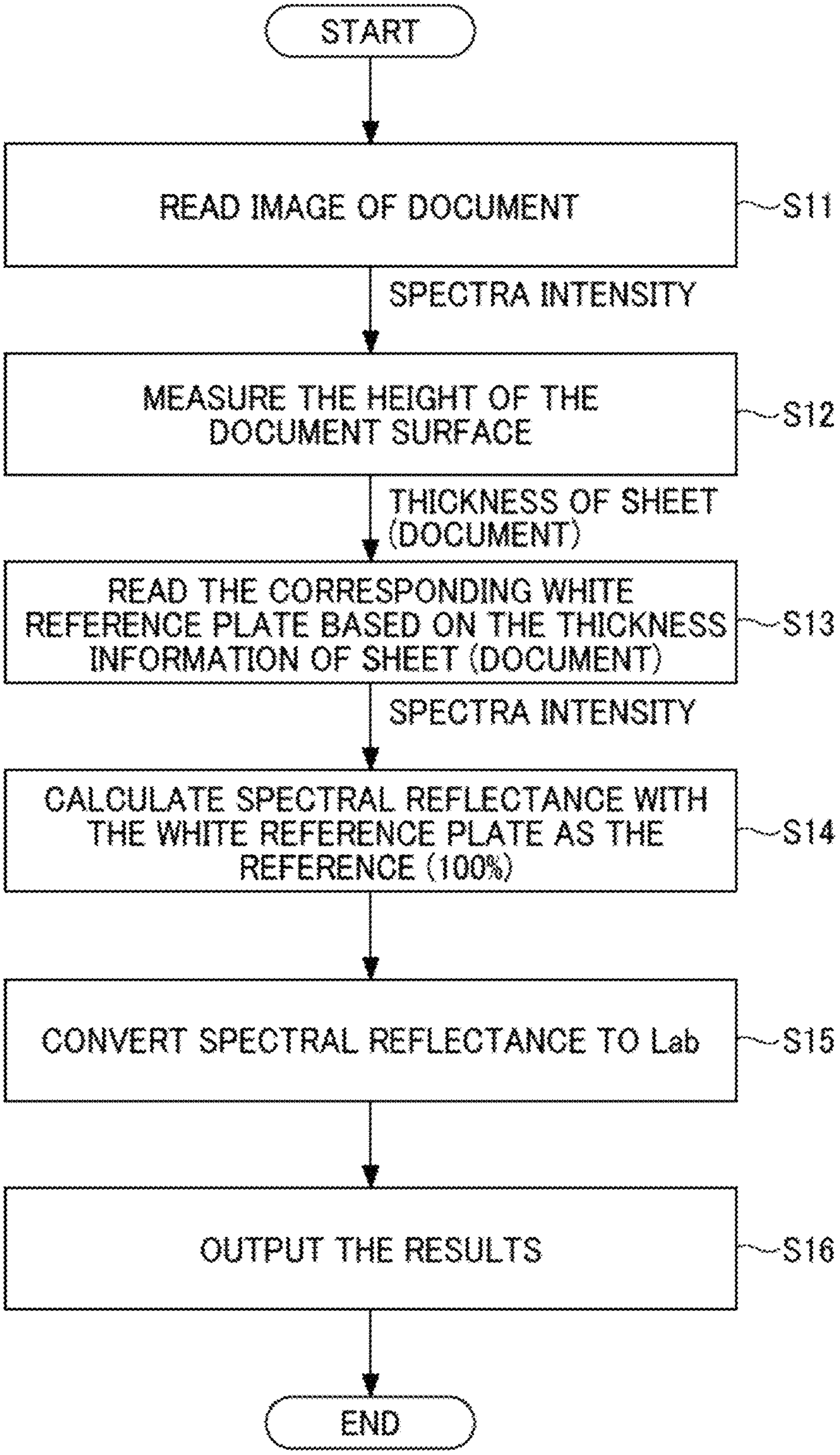
FIG. 7 is a flowchart of an operation of the colorimeter in FIG. 6.
Figure 8A:
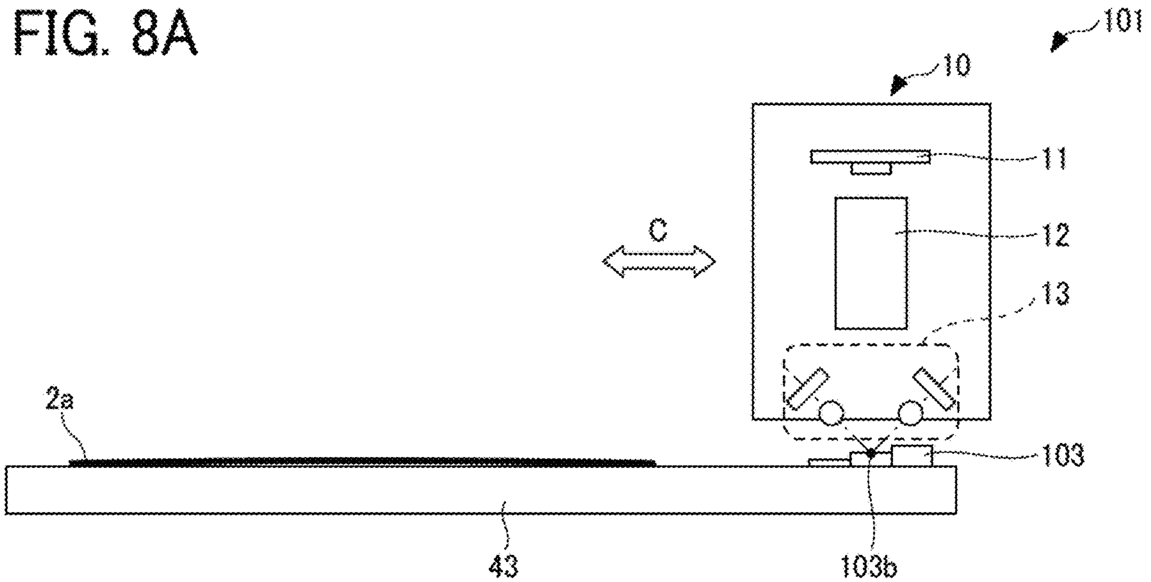
FIGS. 8A, 8B, and 8C are diagrams illustrating a reading position of a white reference according to the first embodiment.
Figure 8B:
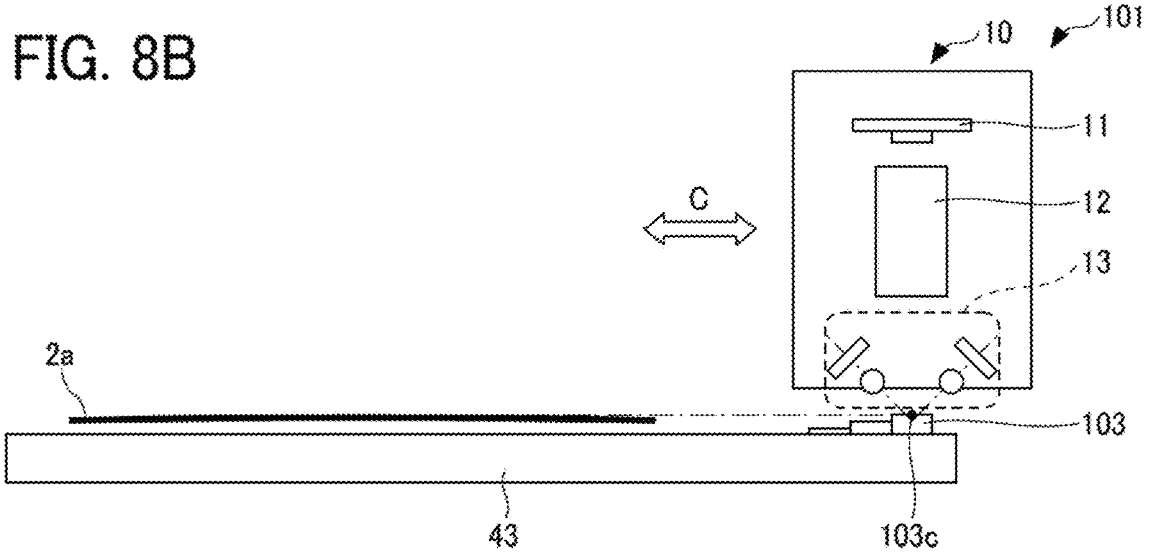
Figure 8C:
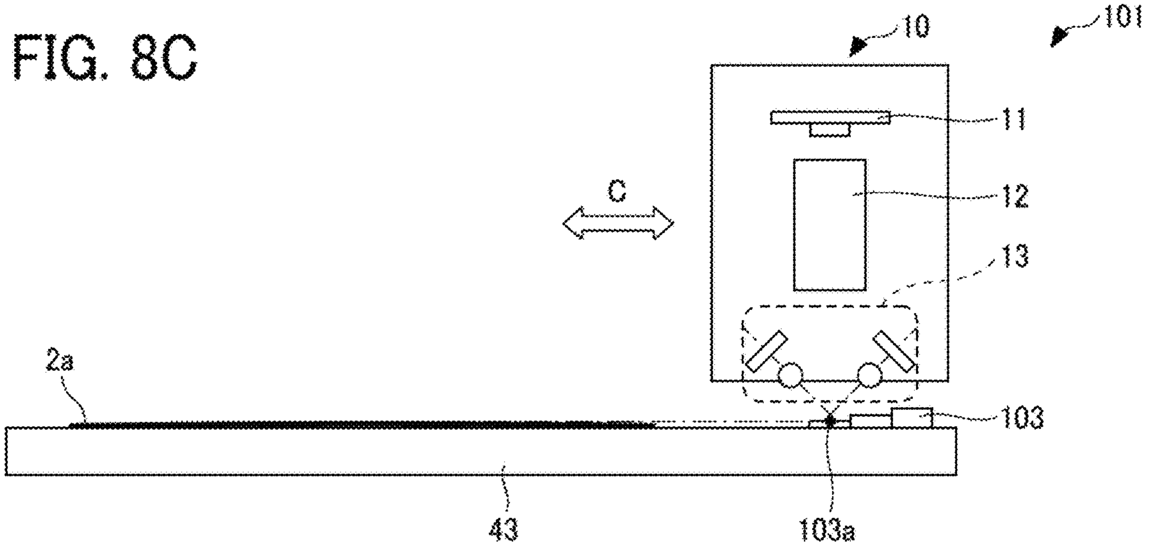

FIG. 7 is a flowchart of an operation of the colorimeter in FIG. 6. FIGS. 8A, 8B, and 8C are diagrams illustrating a reading position of a white reference according to the first embodiment.

The colorimeter 101 of the present embodiment includes the reference plate 103 in FIG. 6 instead of the reference plate 3 of FIG. 6, which is different from the colorimeter 1 of FIGS. 1A and 1B. In the present embodiment, the reader 10 is moved to the region facing the sheet 2 by the control of the movement control unit 22 with the sheet 2 fed from the sheet feeder 41 onto the backing plate 43. Then, the reading control unit 23 controls the reader 10 to read the image formed on the sheet 2 (step S11).

Before or after the process in step S11, in step S12, the displacement sensor 60 measures the height of the reading surface of the sheet 2, supplied from the sheet feeder 41 onto the backing plate 43. In some examples, this measurement is performed by a sensor placed in the vicinity of the upstream end portion of the backing plate 43 in the conveyance direction B of the sheet 2. The thickness of the sheet 2 based on the measured height of the reading surface is acquired by the sheet-thickness acquisition unit 21.

The movement control unit 22 drives the reader conveyor 30 to move the reader 10 to a position facing the reference plate 103. The movement control unit 22 has a table in which the thickness of the sheet 2 to be read by the reader 10 is associated with the corresponding amount of movement of the reader 10 by the reader conveyor 30. For example, when the reference plate 103 having three thickness levels is used as illustrated in FIG. 6, two threshold values, i.e., a large threshold value and a small threshold value, may be set in the table as the thickness of the sheet 2. In this case, as the movement amount of the reader 10 when the thickness of the sheet 2 is larger than the large threshold value, an amount for moving the reader 10 to the region facing the reference reading surface 103*c* of the reference plate 103 is set. Further, as the movement amount of the reader 10 when the thickness of the sheet 2 is smaller than the small threshold value, an amount for moving the reader 10 to the region facing the reference reading surface 103*a* of the reference plate 103 is set. Further, as the movement amount of the reader 10 in a case where the thickness of the sheet 2 is equal to or larger than the small threshold value and equal to or smaller than the large threshold value, an amount for moving the reader 10 to the region facing the reference reading surface 103*b* of the reference plate 103 is set.

Therefore, the movement control unit 22 refers to the table and moves the reader 10 to the region corresponding to the thickness of the sheet 2 acquired by the sheet-thickness acquisition unit 21. The two threshold values, i.e., the large threshold value and the small threshold value, are set in advance based on the thickness of the sheet 2 whose image is read by the colorimeter 101.

For example, when the thickness of the sheet 2 acquired by the sheet-thickness acquisition unit 21 is an average sheet thickness of the sheet thicknesses set in the table, the reader conveyor 30 moves the reader 10 to the region facing the reference reading surface 103*b* of the reference plate 103 as illustrated in FIG. 8A. As described above, the reference reading surface 103*b*, which has an intermediate height, is one of the reference reading surfaces 103*a* to 103*c* of the reference plate 103.

When the thickness of the sheet 2 acquired by the sheet-thickness acquisition unit 21 is larger than the large threshold value set in the table, the reader conveyor 30 moves the reader 10 to the region facing the reference reading surface 103*c* of the reference plate 103 as illustrated in FIG. 8B. As described above, the reference reading surface 103*c*, which is the highest, is one of the reference reading surfaces 103*a* to 103*c* of the reference plate 103.

When the thickness of the sheet 2 acquired by the sheet-thickness acquisition unit 21 is smaller than the small threshold value set in the table, the reader conveyor 30 moves the reader 10 to the region facing the reference reading surface 103*a* of the reference plate 103 as illustrated in FIG. 8C. As described above, the reference reading surface 103*a*, which is the lowest, is one of the reference reading surfaces 103*a* to 103*c* of the reference plate 103.

In this way, the reader 10 moves to the region facing the reference reading surface at a height close to the thickness of the sheet 2 among the reference reading surfaces 103*a* to 103*c* of the reference plate 103. Then, the reading control unit 23 controls the reader 10 to read the white reference in the reading region on the reference reading surface facing the reader 10 (step S13).

The white references of the three reference reading surfaces 103*a* to 103*c* may be read in advance, and when the thicknesses of the sheets 2 to be read in the image are acquired, information based on the white references associated with the thicknesses may be used.

Thus, the reader 10 measures the spectral intensity of the image formed on the sheet 2 and the spectral intensity of the white reference of the reference plate 103.

Subsequently, the calculation unit 24 calculates the spectral reflectance of the image from the spectral intensities of the image formed on the sheet 2, with the spectral intensity of the white reference of the reference plate 103 as a reference of 100 (step S14).

In step S15, the calculation unit 24 converts the spectral reflectance calculated in step S14 into Lab values indicating lightness, hue, and chroma (step S15).

Thereafter, the output unit 25 outputs the reading results based on the Lab values converted in step S15 (step S16).

As described above, in the present embodiment, the thicknesses of the sheets 2 to be read for its image are measured, and the white reference is read from the reference reading surface having a height corresponding to the thicknesses of the sheets 2 among the reference reading surfaces 103*a* to 103*c* having different heights of the reference plate 103. In other words, the reader 10 can reads the white reference from the reference reading surface having a height corresponding to the thicknesses of the sheets 2 among the reference reading surfaces 103*a* to 103*c* having different heights of the reference plate 103. Thus, the lighting conditions for reading images on the sheets 2 and for reading the white reference become similar, reducing the errors that occur when calculating spectral reflectance and allowing for more accurate measurements. In this case, a mechanism for moving the sheet 2 up and down is not involved.

Further, since the reader 10 is moved to the corresponding reference reading surface of the reference plate 103 by the reader conveyor 30, there is no need to select the reference reading surface of the reference plate 103 corresponding to the thickness of the sheet 2 and manually move the reader 10 to the selected reference reading surface. As described above, the reader conveyor 30 moves the reader 10 in the movement direction C between the region facing the sheet 2 fed onto the backing plate 43 and the region facing the reference plate 3. In other words, since this configuration is incorporated into existing colorimeters, there is no need for additional mechanisms, allowing for a simple and inexpensive apparatus.

Further, when several thicknesses are predefined for the sheet 2 to be read by the colorimeter 101, the heights of the stepped reference reading surfaces are set according to the thicknesses. This provides a simple configuration, allowing for reading the white reference from the reference reading surface at the same height as the reading surface of the sheet 2. In the present embodiment, the reference plate 103 has three thickness levels. However, the number of thickness levels is not limited to three. As the number of thickness levels increases, the measurement accuracy increases.

Second Embodiment

Figure 9:
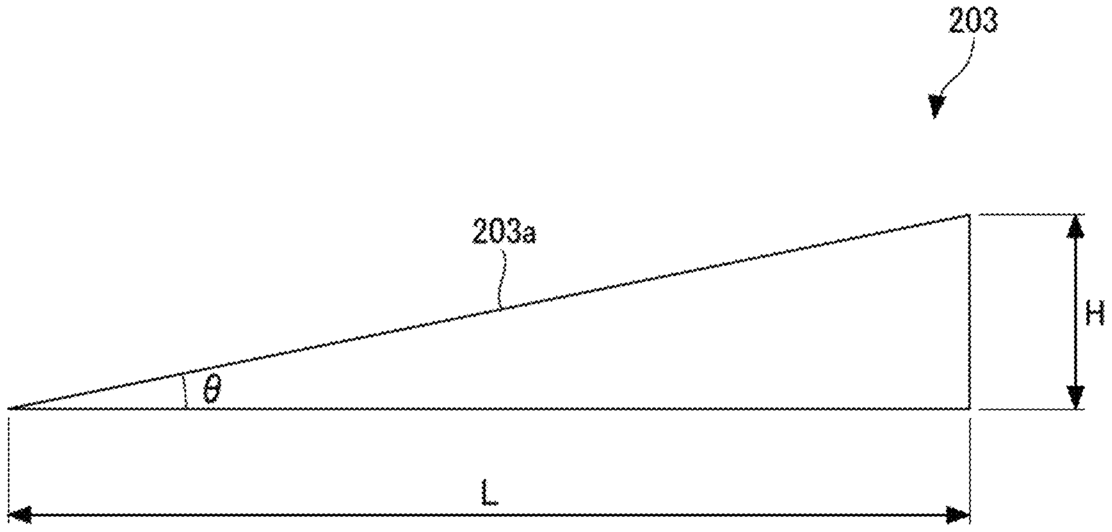
FIG. 9 is a diagram of a reference plate for use in a colorimeter according to a second embodiment of the present disclosure.

FIG. 9 is a diagram of a reference plate for use in a colorimeter according to a second embodiment of the present disclosure.

As illustrated in FIG. 9, the reference plate 203 used in the present embodiment has a tilted reference reading surface 203*a* for reading the white reference. In this configuration, the height of the reference reading surface 203*a* continuously changes so that the reference reading surface 203*a* of the reference plate 203 has multiple heights. The reference plate 203 may be configured such that the reference plate 203 itself has a color indicating the white reference, or the white reference may be displayed on the reference reading surface 203*a*.

Figure 10A:
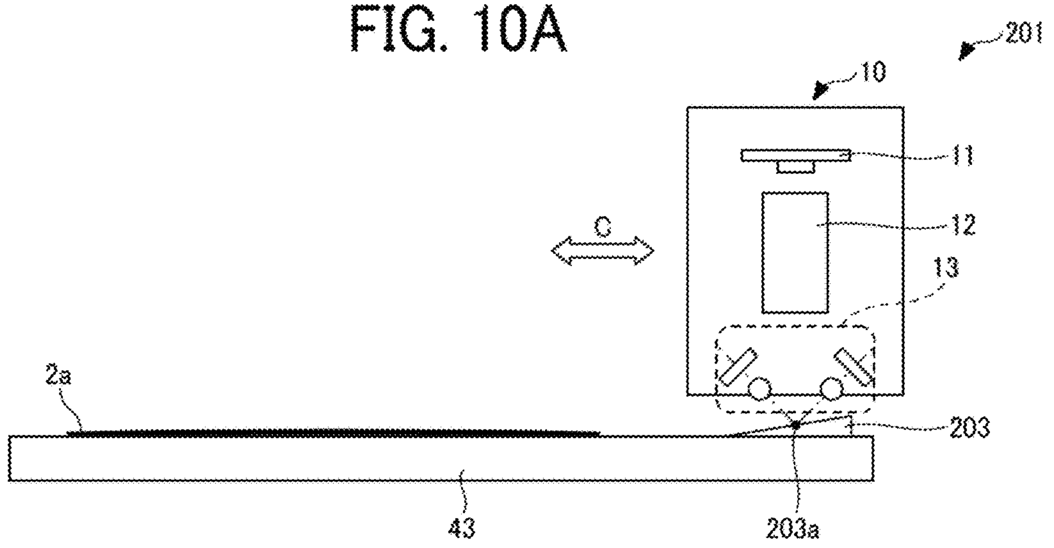
FIGS. 10A, 10B, and 10C are diagrams illustrating a reading position of a white reference according to the second embodiment.
Figure 10B:
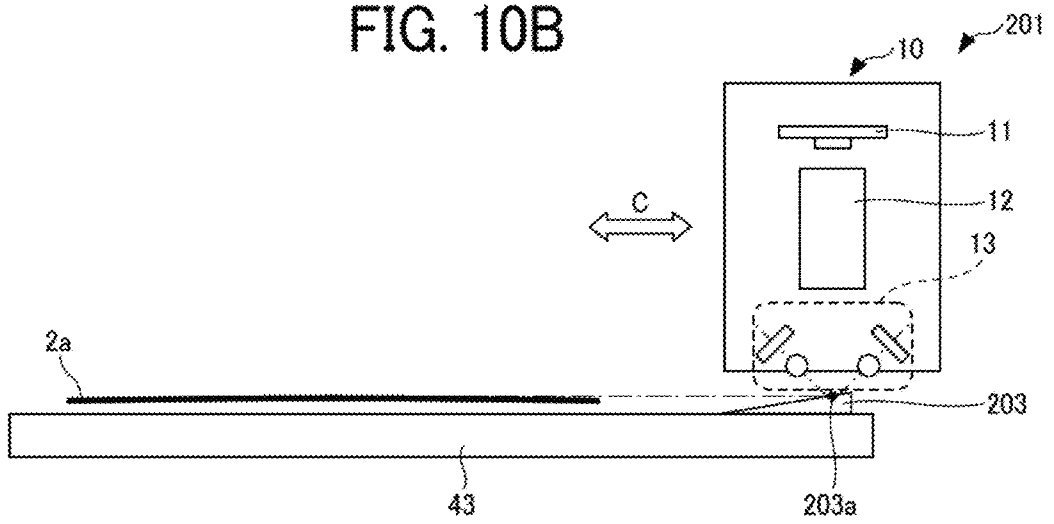
Figure 10C:
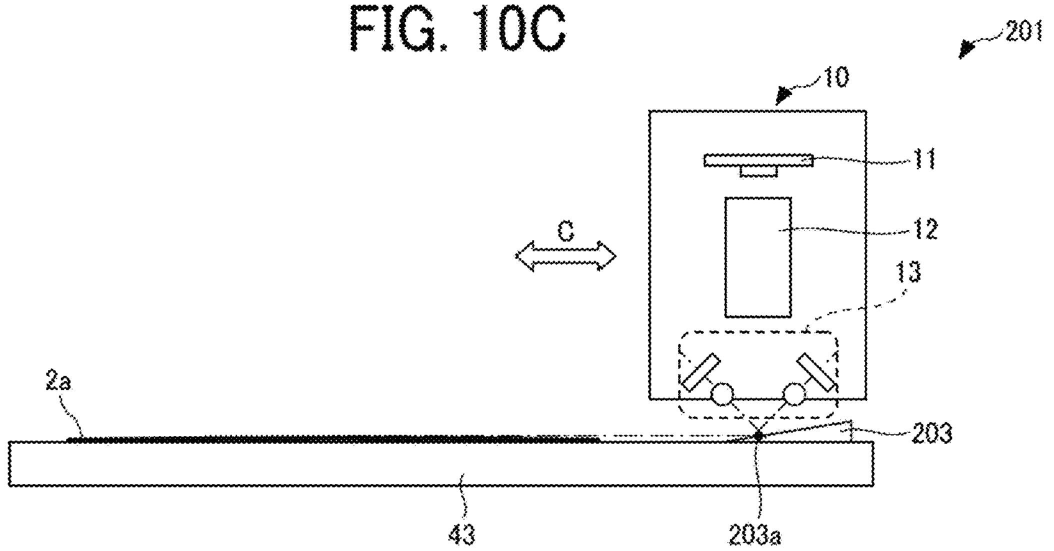

FIGS. 10A, 10B, and 10C are diagrams illustrating a reading position of a white reference according to the second embodiment.

The colorimeter 201 of the present embodiment includes the reference plate 203 in FIG. 9 instead of the reference plate 3 of FIG. 6, which is different from the colorimeter 1 of FIGS. 1A and 1B. In this configuration, the height of the reference reading surface 203*a* of the reference plate 203 continuously changes. The movement control unit 22 associates the thickness of sheet 2 with the movement amount of the reader 10 to the region of reference reading surface 203*a* at the same height as the thickness of sheet 2. The movement control unit 22 causes the reader conveyor 30 to move the reader 10 to a region where the height of the reference reading surface 203*a* matches the thickness of the sheet 2 acquired by the sheet-thickness acquisition unit 21.

For example, when the thickness of the sheet 2 acquired by the sheet-thickness acquisition unit 21 is an average sheet thickness of the sheet thicknesses set in the table, the reader conveyor 30 moves the reader 10 to the region facing the center portion of the reference reading surface 203*a* of the reference plate 203 as illustrated in FIG. 10A.

When the thickness of the sheet 2 acquired by the sheet-thickness acquisition unit 21 is thick, the reader conveyor 30 moves the reader 10 to a region facing a higher portion of the reference reading surface 203*a* of the reference plate 203 as illustrated in FIG. 10B.

When the thickness of the sheet 2 acquired by the sheet-thickness acquisition unit 21 is thin, the reader conveyor 30 moves the reader 10 to a region facing a lower portion of the reference reading surface 203*a* of the reference plate 203 as illustrated in FIG. 10C.

In this way, the reader 10 is moved to a region facing a portion at the same height as that of the sheet 2, in the reference reading surface 203*a* of the reference plate 203. Then, the reading control unit 23 controls the reader 10 to read the white reference in the reading region on the reference reading surface facing the reader 10.

The white references on the reference reading surface 203*a* may be read in advance and associated with its height. When the thicknesses of the sheet 2, which is to be read for its image are acquired, information based on the white references associated with the thicknesses may be used.

As described above, in the present embodiment, the thicknesses of the sheets 2, which are to be read for their images, are measured, and the white reference is read from the region on the reference reading surface 203*a* of the reference plate 203, which has a continuously variable height matching the thickness of the sheet 2. Thus, the lighting conditions for reading images on the sheets 2 and for reading the white reference become the same, reducing the errors that occur when calculating spectral reflectance and allowing for more accurate measurements. In this case, a mechanism for moving the sheet 2 up and down is not involved.

The following describes whether the measurement accuracy can be actually guaranteed by the reference plate 203 illustrated in FIG. 9.

The thickness of each of the sheets for the colorimeter 1 illustrated in FIGS. 1A and 1B is 0.8 mm. Further, the illumination angle $\alpha$ (see FIGS. 4A, 4B, and 4C) of each of the light beams from the light sources 14*a* and 14*b* is set to 45±1 degrees in order to ensure accuracy.

As illustrated in FIG. 9, the reference reading surface 203*a* of the reference plate 203 has a height H (or a thickness) of 0.8 mm at its thickest portion. Calculating with an angle $\theta$ of 0.5 degrees (half of 1 degree) to form the slope of the reference reading surface 203*a* results in a length of approximately 92 mm for the reference plate 203.

The reference plate 203 with a length L of 92 mm can be sufficiently installed in the colorimeter 1. In other words, the length L of 92 mm is sufficient for the reference plate 203 to be installed in the colorimeter 1.

Regarding the capability to measure a reference plate for a sheet with a thickness of 0.05 mm, when the reference reading surface of the reference plate is tilted at an angle of 0.5 degrees, a horizontal movement of 5.7 mm is involved to accommodate a height change of 0.05 mm. The reader conveyor 30 can accurately stop the reader 10 and accommodate such horizontal movement.

Third Embodiment

Figure 11A:
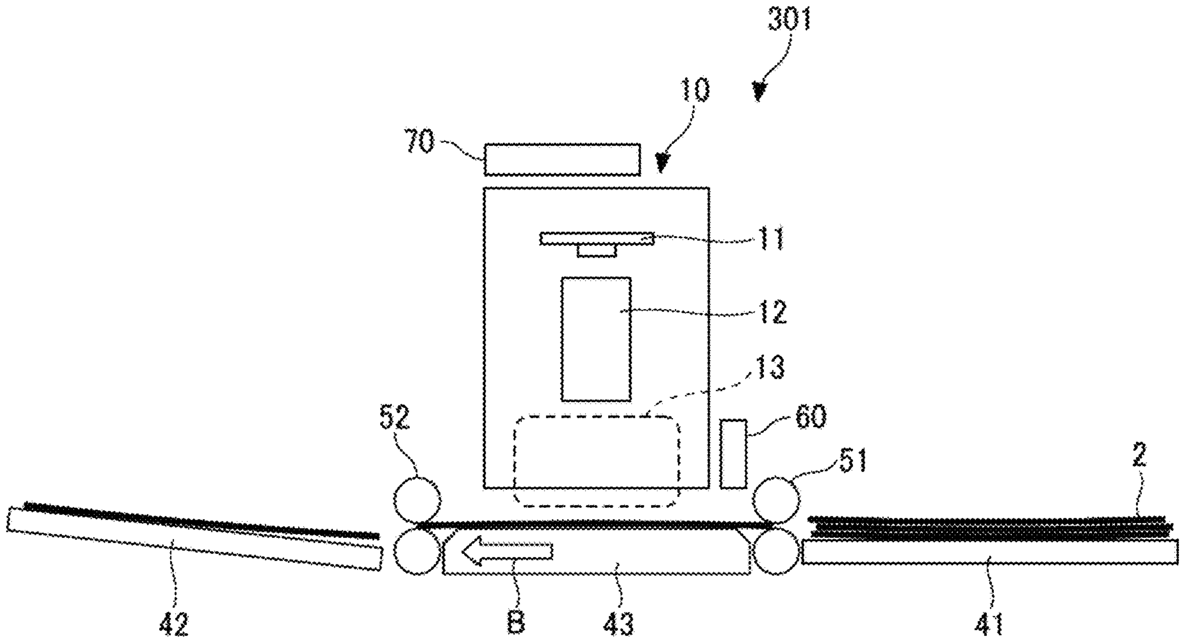
FIGS. 11A and 11B are diagrams of a colorimeter according to a third embodiment of the present disclosure.
Figure 11B:
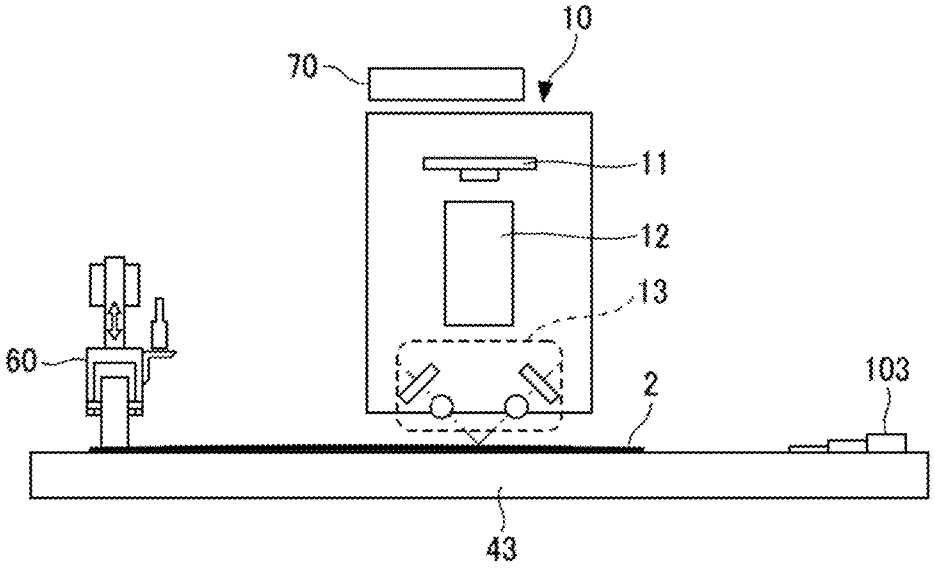

FIGS. 11A and 11B are diagrams of a colorimeter according to a third embodiment of the present disclosure. FIG. 11A is a diagram of a colorimeter 301 as viewed in a direction orthogonal to the conveyance direction of sheet. FIG. 11B is a side view of the colorimeter 301 in FIG. 11A as viewed in a direction from the sheet feeder 41.

As illustrated in FIGS. 11A and 11B, the colorimeter 301 of the present embodiment includes the reference plate 103 in FIG. 6, instead of the reference plate 3 of FIG. 6, and a displacement sensor 60 and the operation panel 70, which are different from the colorimeter 1 of FIGS. 11A and 11B.

The displacement sensor 60 is an example of a detector of the present embodiment. The displacement sensor 60 is placed on the backing plate 43, in a region along the conveyance path of the sheet 2 where the displacement sensor 60 does not interfere with the movement of the reader 10. The displacement sensor 60 has a roller on a surface facing the backing plate 43. When a sheet 2 is fed from the sheet feeder 41 to the backing plate 43, the roller of the displacement sensor 60 is lifted. The displacement sensor 60 detects this lift to measure the thickness of the sheet 2. The detection by the displacement sensor 60 with a roller is within a range of several millimeters, resulting in a measurement resolution in the submicron range.

The operation panel 70 is an example of the input device, which is externally operable.

Figure 12:
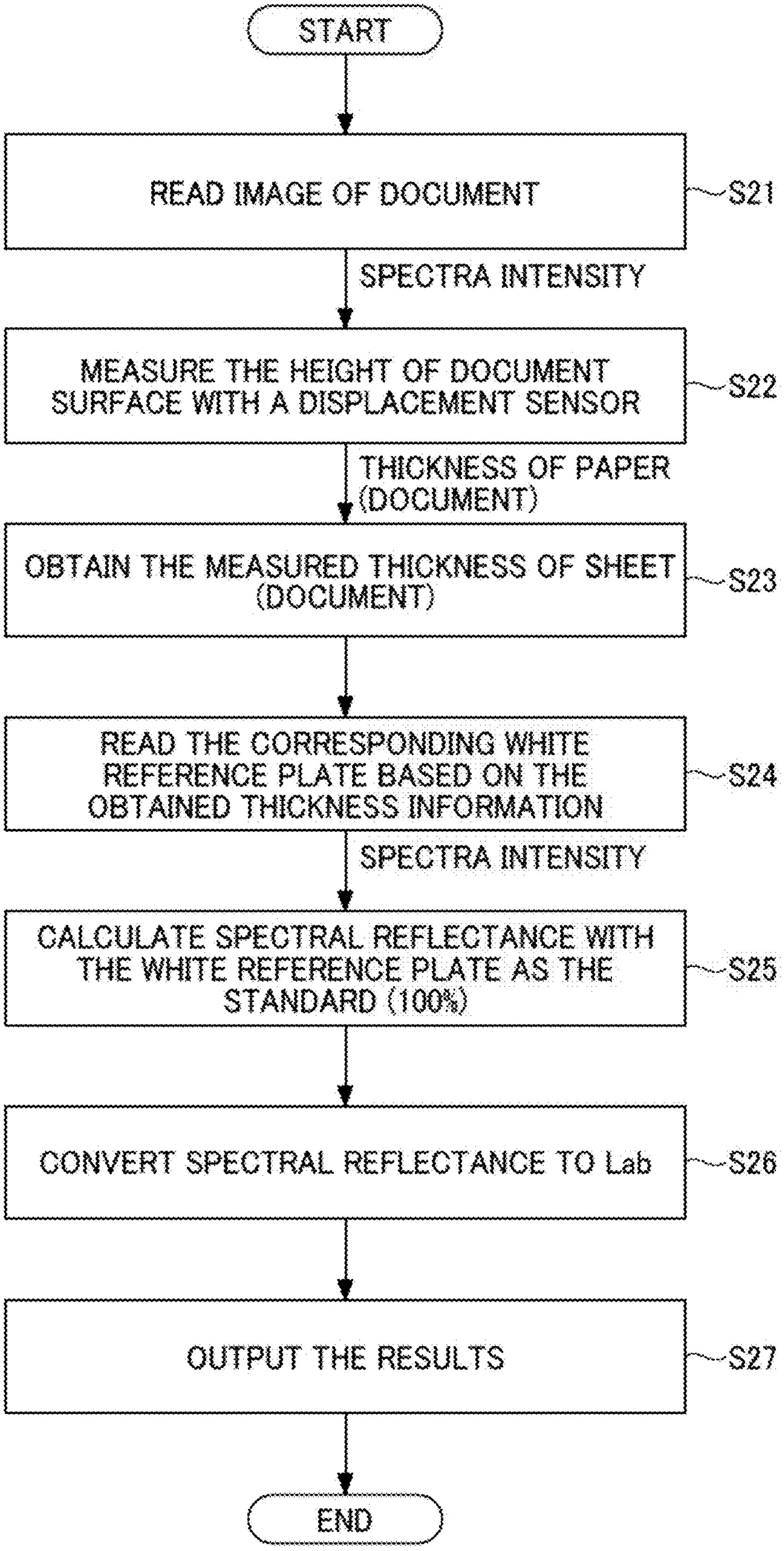
FIG. 12 is a flowchart of the operation of the colorimeter in FIGS. 11A and 11B.

FIG. 12 is a flowchart of the operation of the colorimeter 301 in FIGS. 11A and 11B.

In the present embodiment, the reader 10 is moved to the region facing the sheet 2 by the control of the movement control unit 22 with the sheet 2 fed from the sheet feeder 41 onto the backing plate 43. Then, the reading control unit 23 controls the reader 10 to read the image formed on the sheet 2 (step S21).

Before or after the process in step S21, in step S22, the displacement sensor 60 measures the height of the reading surface of the sheet 2, supplied from the sheet feeder 41 onto the backing plate 43.

The sheet-thickness acquisition unit 21 acquires the thickness of the sheet 2 based on the measured height of the reading surface (step S23).

The movement control unit 22 drives the reader conveyor 30 to move the reader 10 to a position facing the reference plate 103. Accordingly, the reader 10 moves to a region facing the reference reading surface at a height close to the thickness of the sheet 2 among the reference reading surfaces 103*a* to 103*c* of the reference plate 103. Then, the reading control unit 23 controls the reader 10 to read the white reference in the reading region on the reference reading surface facing the reader 10 (step S24).

Thus, the reader 10 measures the spectral intensity of the image formed on the sheet 2 and the spectral intensity of the white reference of the reference plate 103.

Subsequently, the calculation unit 24 calculates the spectral reflectance of the image from the spectral intensities of the image formed on the sheet 2, with the spectral intensity of the white reference of the reference plate 103 as a reference of 100 (step S25).

In step S26, the calculation unit 24 converts the spectral reflectance calculated in step S14 into Lab values indicating lightness, hue, and chroma (step S26).

Thereafter, the output unit 25 outputs the reading results based on the Lab values converted in step S15 (step S27).

In the present embodiment, the displacement sensor 60 that detects the thickness of the sheet 2 is used. The calculation unit 24 performs calculation on color information using a white reference read by the reader 10 from a reading area at a height corresponding to the thickness of the sheet detected by the displacement sensor 60. The processing of the colorimeter does not involve measuring the thickness of the sheet 2 independently. Further, the placement of the displacement sensor 60 on the conveyance path of the sheet 2 allows for the measurement of the thickness of the sheet 2 during its conveyance. This enhances the processing efficiency.

The thickness of the sheet 2 fed from the sheet feeder 41 onto the backing plate 43 may be input by an operator using an operation panel 70. In this case, the operator can input the thickness of the sheet 2 while checking the thickness.

Image Forming Apparatus

The following describes an example of an image forming apparatus including the colorimeter 101 among the colorimeters 101, 201, and 301 described above.

Figure 13:
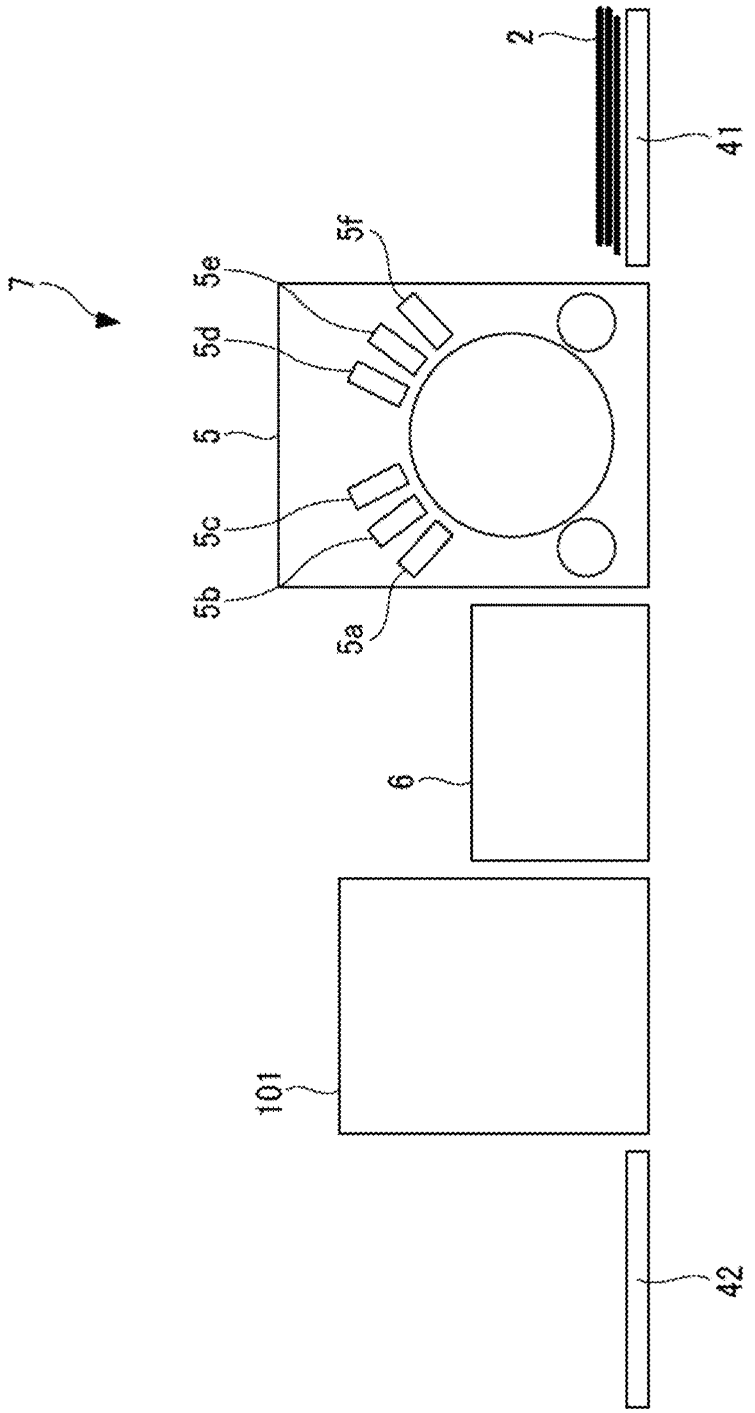
FIG. 13 is a diagram of an image forming apparatus incorporating the colorimeter in FIGS. 8A, 8B, and 8C.

FIG. 13 is a diagram of an image forming apparatus including the colorimeter 101 as illustrated in FIGS. 8A, 8B, and 8C.

An image forming apparatus 7 in FIG. 13 is an inkjet image forming apparatus. The image forming apparatus 7 includes the colorimeter 101 of FIGS. 8A, 8B, and 8C, a sheet feeder 41, a sheet ejector 42, an image forming unit 5 (or an image former), and a dryer 6. The image forming apparatus 7 incorporating the colorimeter 101 allows in-line acquisition of the spectral characteristics and adjustment of the image forming conditions.

The image forming unit 5 includes multiple print heads 5*a* to 5*g*. For example, the print head 5*a* discharges green ink. The print head 5*b* discharges orange ink. The print head 5*c* discharges yellow ink. The print head 5*d* discharges magenta ink. The print head 5*e* discharges cyan ink. The print head 5*f* discharges black ink. Based on image information, the image forming unit 5 discharges ink of a corresponding color onto the sheet 2. The ink discharged from the inkjet is attached to the sheet 2 to form a visible image. The image forming unit 5 supplies the sheet 2 coated with the ink to the dryer 6.

The dryer 6 dries the ink while conveying the sheet 2.

In the image forming apparatus 7 according to the present example, the sheet 2 placed in the sheet feeder 41 is fed to the image forming unit 5 to form an image.

The sheet 2 with the formed image is fed to the dryer 6 to dry the ink.

The colorimeter 101 acquires the spectral characteristics of the image data of the sheet 2 by reading its color information. The surface of the sheet 2 from which the color information is read by the colorimeter 101 is the surface to which the ink is attached by the image forming unit 5. The colorimeter 101 operates when the image forming apparatus 7 is activated, when the type of the sheet 2 is changed, and when periodic inspection is performed. For example, periodic inspection is performed after a certain period of operation. The colorimeter 101 monitors color unevenness and color variation in the image surface of the sheet 2 based on the acquired data relating to the spectral characteristics.

The data acquired by the colorimeter 101 is output to the controller of the image forming apparatus 7.

The controller of the image forming apparatus 7 adjusts the amount of ink to be discharged from the print heads 5*a* to 5*f* based on the monitoring results of the colorimeter 101. The controller of the image forming apparatus 7 adjusts the image forming conditions based on the monitoring results of the colorimeter 101. The controller of the image forming apparatus 7 serves as an image evaluation apparatus, which serves to increase color reproducibility.

Aspects of the present disclosure are as follows, for example.

Aspect 1

A colorimeter includes: a reference plate having a reference reading surface having multiple heights; a reader, and a calculation unit. The reader reads color information on a recording medium having a thickness; and reads a white reference from the reference reading surface having one of the multiple heights corresponding to the thickness of the recording medium. The calculation unit performs calculation on the color information on the recording medium read by the reader using the white reference read from the reference reading surface by the reader.

Aspect 2

In the colorimeter according to Aspect 1, the reference plate has steps having multiple reference reading surfaces including the reference reading surface. The multiple reference reading surfaces respectively have the multiple heights.

Aspect 3

In the colorimeter according to Aspect 1, the reference plate has a tilted surface having the multiple heights.

Aspect 4

The colorimeter according to Aspect 1, further includes a conveyor to move the reader between a first position facing the recording medium and a second position facing the reference reading surface having one of the multiple heights corresponding to the thickness of the recording medium.

Aspect 5

The colorimeter according to Aspect 1, further includes a detector to detect the thickness of the recording medium. The reader reads the white reference from the reference reading surface having one of the multiple heights corresponding to the thickness of the recording medium detected by the detector.

Aspect 6

In the colorimeter according to Aspect 5, the detector is on a conveyance path of the recording medium.

Aspect 7

The colorimeter according to Aspect 1, further includes an input device to receive the thickness of the recording medium. The reader reads the white reference from the reference reading surface having one of the multiple heights corresponding to the thickness of the recording medium received by the input device.

Aspect 8

In the colorimeter according to Aspect 7, the input device includes an operation panel that is externally operable.

Aspect 9

An image forming apparatus includes the colorimeter according to claim 1; and an image former to form the image on the recording medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. A colorimeter comprising:

a reference plate having a reference reading surface having multiple heights;

a reader configured to:

read color information on a recording medium having a thickness; and read a white reference from the reference reading surface having one of the multiple heights corresponding to the thickness of the recording medium; and circuitry configured to perform calculation on the color information on the recording medium read by the reader using the white reference read from the reference reading surface by the reader.

2. The colorimeter according to claim 1, wherein the reference plate has steps having multiple reference reading surfaces including the reference reading surface, the multiple reference reading surfaces respectively have the multiple heights.

3. The colorimeter according to claim 1, wherein the reference plate has a tilted surface having the multiple heights.

4. The colorimeter according to claim 1, further comprising a conveyor to move the reader between:

a first position facing the recording medium; and a second position facing the reference reading surface having one of the multiple heights corresponding to the thickness of the recording medium.

5. The colorimeter according to claim 1, further comprising a detector to detect the thickness of the recording medium, wherein the reader reads the white reference from the reference reading surface having one of the multiple heights corresponding to the thickness of the recording medium detected by the detector.

6. The colorimeter according to claim 5, wherein the detector is on a conveyance path of the recording medium.

7. The colorimeter according to claim 1, further comprising an input device to receive the thickness of the recording medium, wherein the reader reads the white reference from the reference reading surface having one of the multiple heights corresponding to the thickness of the recording medium received by the input device.

8. The colorimeter according to claim 7, wherein the input device includes an operation panel that is externally operable.

9. An image forming apparatus comprising:

the colorimeter according to claim 1; and an image former to form the image on the recording medium.

10. A colorimeter comprising:

a reference plate having a reference reading surface having multiple heights;

a reader configured to:

read color information on a recording medium having a thickness; and read a white reference from the reference reading surface having one of the multiple heights corresponding to the thickness of the recording medium; and circuitry configured to perform calculation on the color information on the recording medium read by the reader using the white reference read from the reference reading surface by the reader, wherein the reference plate has steps having multiple reference reading surfaces including the reference reading surface, the multiple reference reading surfaces respectively have the multiple heights.

* * * * *